Figure 1:
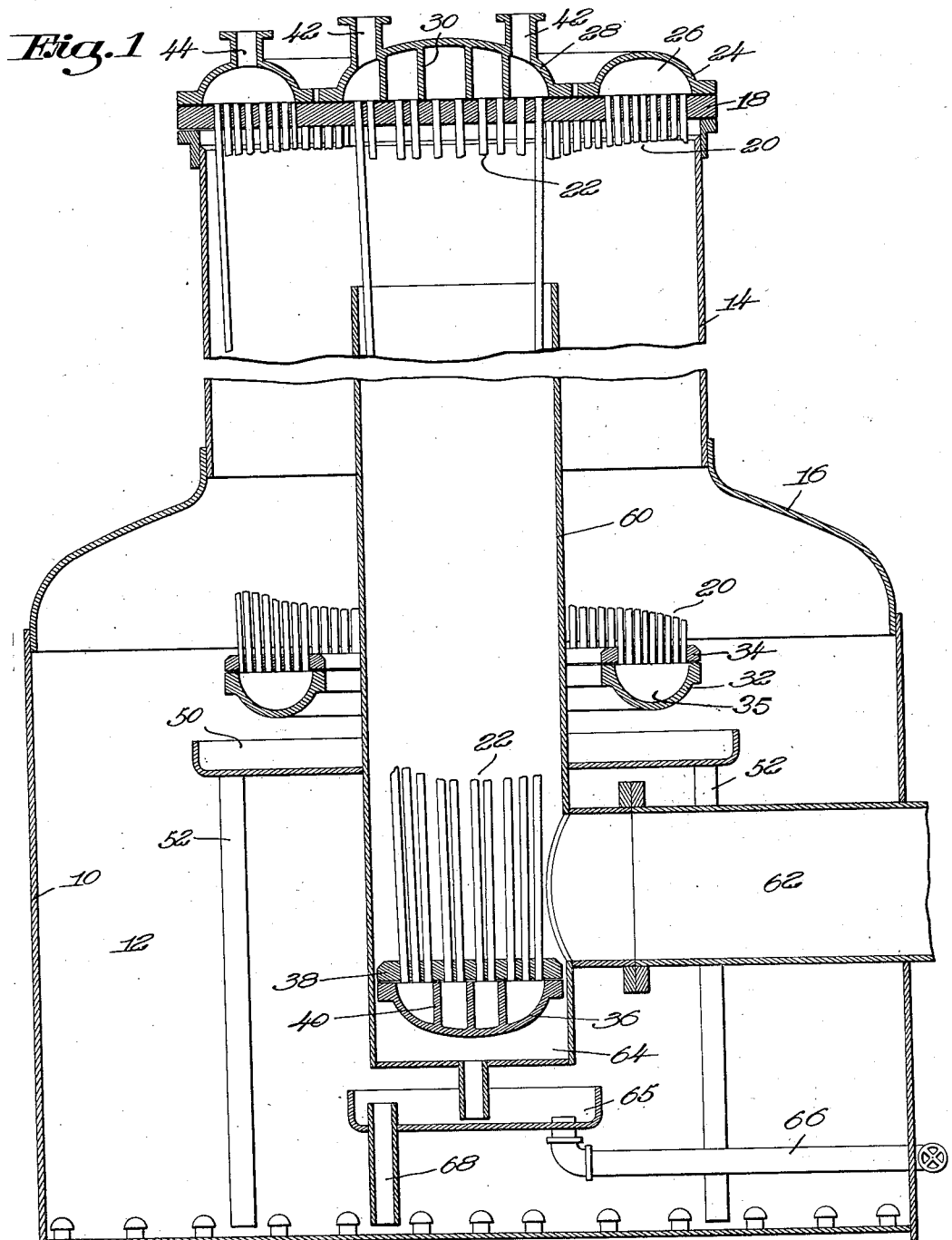

Dec. 18, 1934.  N. WEBER  1,985,068
OIL REFINING APPARATUS
Filed April 13, 1932    3 Sheets-Sheet 1

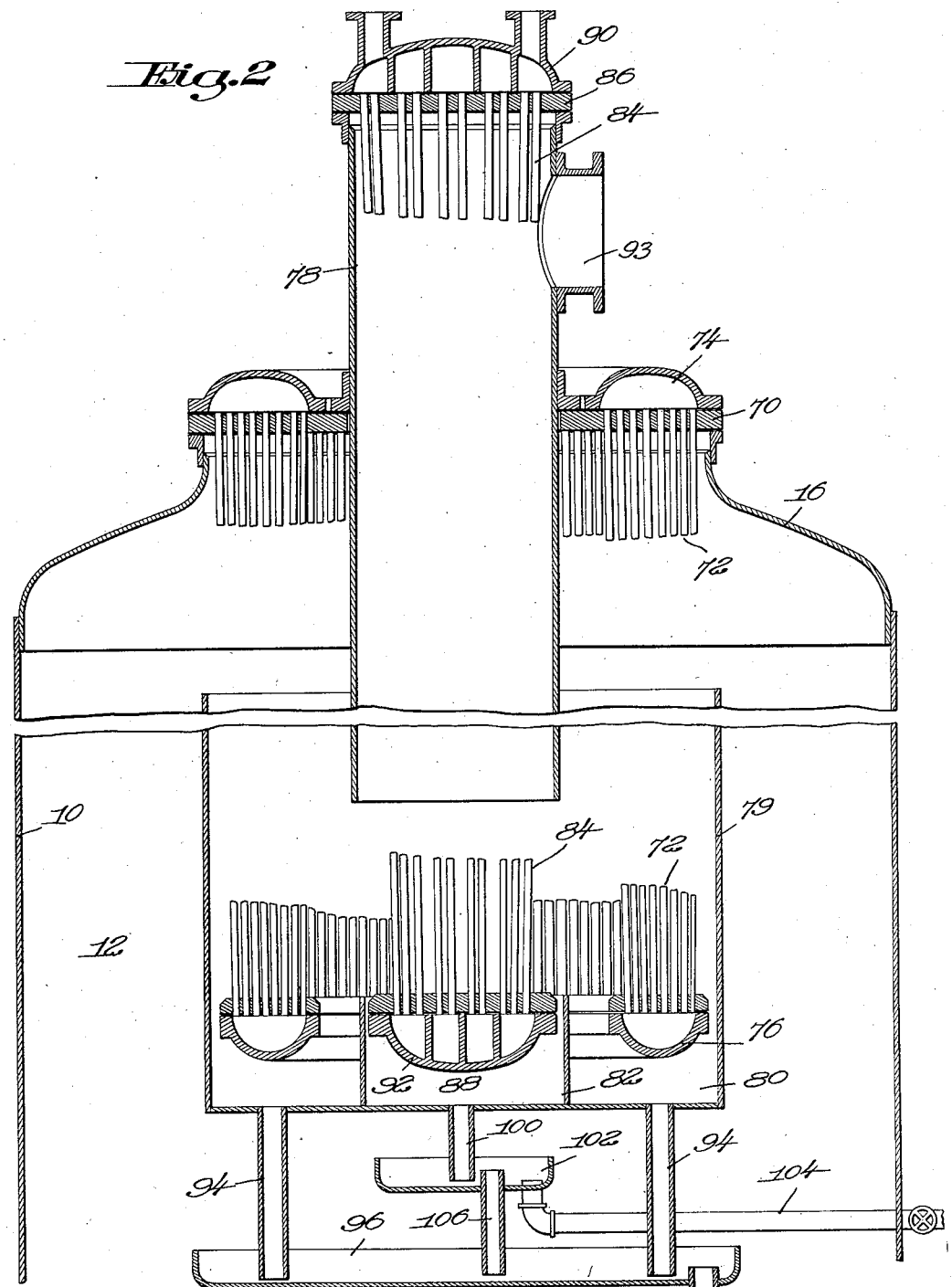

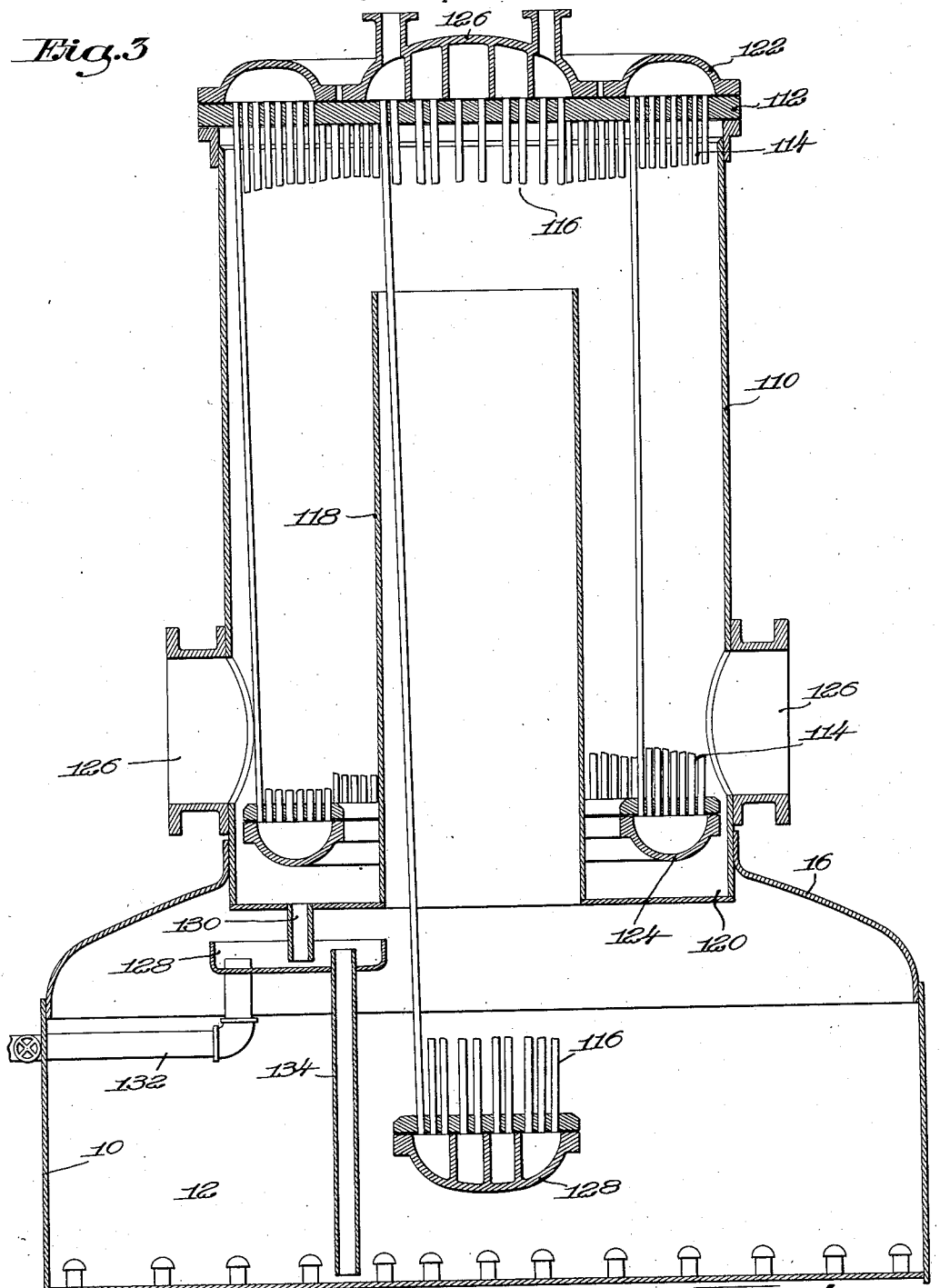

Patented Dec. 18, 1934

1,985,068

UNITED STATES PATENT OFFICE 1,985,068

OIL REFINING APPARATUS

Nicholas Weber, New York, N. Y., assignor to C. H. Leach Company, New York, N. Y., a corporation of New Jersey Application April 13, 1932, Serial No. 604,966

13 Claims. (Cl. 257—34)

The present invention relates to oil refining apparatus and more particularly to vapor condensing apparatus designed for employment in conjunction with bubble towers and forming essentially a part thereof.

According to the present invention, the vapors generated in the bubble tower are separated in such a manner as to return the heavier reflux directly to the bubble tower for re-evaporation, and to conduct condensate from the light vapor without the tower for any use to which it may be put. To this end the entire vapor content of the bubble tower is caused to ascend into a cooling region by an annular ring of cooling tubes surrounding an inner core or bank of cooling tubes. The vapor is caused to pass alternately through the outer ring and thence through the inner core, or vice versa, the temperature of the two sets of tubes being controlled to secure fractionation of the vapor and the production of different condensates.

In the preferred form of the invention, the ascending vapor is first caused to contact with an outer ring of tubes consisting of a large number of closely spaced cooling tubes which tend to condense what may be termed the heavier reflux for return to the tower with a consequent re-evaporation. After traversing throughout the entire length of the outer tube ring, the remaining vapor is caused to reverse its flow and pass through the inner core of tubes, condensing the lighter vapors which are normally removed from the tower, the remaining vapor finally being conducted without the tower for subsequent handling.

Although in the preferred method of operation the heavier reflux, which may comprise 70 percent of the condensate, is preferably cooled in the outer tubular ring where a greater tube area is available, nevertheless, under certain circumstances, it may be desirable to initially conduct the entire volume of vapor lengthwise of the inner core of tubes and thence through the outer tube ring to permit final condensation of lighter vapors. Obviously such an arrangement might depend upon the character of the vapor and the nature of the products to be separated therefrom, where the reflux is conducted back to the bubble tower for re-evaporation and constitutes the major portion of the condensate produced. The form of construction which employs an outer ring of tubes as the region for condensing the heavier material is undoubtedly preferable.

In the accompanying drawings illustrating the preferred form of the invention, Fig. 1 represents partially diagrammatically and in sectional elevation the upper portion of a bubble tower embodying the improved condensing apparatus; Fig. 2 is a view similar to Fig. 1, showing a slightly modified form of apparatus for condensing the vapor and handling the condensate; and Fig. 3 is a view similar to Figs. 1 and 2, in which the vapor is initially caused to contact with the inner tube bank instead of the outer ring of tubes.

In the illustrated embodiment of the invention as shown in Fig. 1, the shell of the bubble tower is indicated generally at 10, enclosing a vapor space 12 in the upper portion thereof. This shell is surmounted by a smaller shell 14, connected thereto through a connecting sleeve 16. The shell 14 is provided with a flat tube head 18, mounted at the upper end and having virtually two series of tubes depending therefrom. These tubes are indicated respectively as an outer tube ring 20 surrounding an inner core of tubes 22. Both series of tubes project downwardly into the region 12, the tube bundles being of dissimilar length to cause a greater projection of the inner core than the outer bank for a reason to be presently described. Cooling medium is conducted separately through the interior of each bank of tubes by individual cover members connected to the flat tube head 18. As indicated, the flow of cooling medium through the outer tube ring is controlled by an annular cover member 24 encompassing a cooling fluid passage 26, and an inner circular cover member 28 enclosing a series of cooling fluid passages formed by partitions 30. The lower end of the tube ring 20 is closed by an annular cover member 32 cooperating with a floating tube head 34 to provide a return passage 35 communicating with the interior of the tubes. In like manner the lower end of the inner tube bank 22 is closed by a cover member 36 cooperating with a floating head 38 to encompass a series of return passages formed by partitions 40. Cooling medium is conducted to the interior of the central tube bank by connections 42, and to the interior of the outer tube ring by connections 44, for the purpose of accurately controlling the temperature of the condensing tubes.

The ascending vapor first traverses upwardly in contact with the outer tube ring, and the condensate produced thereby rains down and is collected in a pan 50 positioned beneath the outer ring in the upper portion of the region 12. This condensate, in the form of a heavier reflux, is conducted back to the bubble tower by pipes 52 for re-evaporation. After completing its upward traverse through the outer ring 20, the vapor is caused to reverse its direction and traverse downwardly throughout the length of the inner tube bank. It will be evident from an inspection of the drawings that the direction and character of the flow of the vapor is controlled by a circular baffle 60, separating the two banks and extending upwardly about the inner tube bank to a point short of the upper tube head 18, allowing for free interconnection between the two banks. After completing its traverse downwardly through the inner bank of tubes, the remaining uncondensed vapor is conducted outwardly through a passage 62.

The condensate produced by traverse of the vapor along the inner bank is collected in a separate chamber 64 and thence conducted to a pan 65, from which it is removed through a pipe 66. This pan, as desired, may be provided with an overflow control 68, to prevent spilling of the condensate from the pan 65.

With this construction it will be evident that the heavier reflux is condensed separately and returned directly to the bubble tower, whereas in the same operation lighter vapors are condensed and conducted without the bubble tower if so desired.

In the construction shown in Fig. 2, the general arrangement of the bubble tower and condensing apparatus is similar to Fig. 1. In this case the shell 10 of the bubble tower is provided with an upper reduced portion 16 which directly supports a tube head 70. This tube head is in the form of a ring which carries an outer tube bank 72, projecting downwardly well into the region 12. Control of cooling fluid through this outer ring of tubes is had through the members 74, 76 previously described. Located within the tube ring and projecting thereabove is a shell of reduced diameter 78, which projects downwardly within the tube ring to provide separate vapor passages, as will be obvious. Surrounding the lower portion of the outer tube ring is a similar baffle 79 of larger diameter encompassing the lower portion of the outer tube ring, but leaving a space between the upper portion of the tube ring and the outer shell 16 to provide for the free entrance of vapors rising from the region 12. In this construction the vapors contact with the outer tube ring, traverse downwardly throughout the length of the ring, and condensate due to this engagement rains downwardly into an annular condensate chamber 80, formed on the bottom portion of the shell 79 through the employment of a separating circular partition 82.

After traversing downwardly throughout the outer tube ring, the vapor passes upwardly throughout the inner core of tubes 84, depending from a tube head 86, mounted at the upper end of the shell 78. Condensate formed as a result of contact with the inner tube ring is collected in a chamber 88 formed by the partition 82. The inner tube bank is provided with cover members 90 and 92, which control the flow of cooling fluid therethrough as previously described. After traversing upwardly throughout substantially the length of the inner tube bank, uncondensed vapors are led outwardly through a passage 93.

Heavier reflux collected in the outer annular condensate chamber 80 is immediately drained by gravity through pipes 94 into a drainage pan 96, and thence returned through the pipe 98 to the bubble tower. Lighter vapors condensed in the inner chamber 88 are conducted through the pipe 100 to the pan 102, from which they may be led outwardly of the tower through the connection 104, or delivered by a pipe 106 to the pan 96 for mixture in whole or in part, if so desired, with the reflux.

In the construction shown in Fig. 3, the shell of the bubble tower, indicated at 10, is provided with a reduced sleeve 16 which supports a condenser shell 110. Mounted at the top of the shell 110 is a flat tube sheet 112, from which depends an outer tube ring 114 and an inner tube bank 116, the inner bank projecting downwardly into the region 12 well below the outer tube ring. The two banks are separated from one another by a circular and substantially cylindrical partition 118 concentric with the shell 110 and connected with the shell at the bottom portion to provide an annular condensate chamber 120 for collection of condensate raining downwardly from the outer ring. This shell extends upwardly to a point below the tube head, allowing a space for the passage of vapor from the inner to the outer bank.

Control of the cooling fluid medium is, as previously described, through the use of cover rings 122 and 124, and inner cover members 126 and 128. Vapor ascending from the tower passes upwardly throughout the length of the inner tube bank, and condensate resulting therefrom is allowed to rain downwardly directly into the bubble tower. After its traverse throughout the length of the inner tube bank, the remaining vapor passes downwardly in contact with the outer tube ring, condensate resulting therefrom being collected in the chamber 120. Uncondensed vapor, after its traverse through the outer ring, passes onwardly through oppositely disposed connections 126. Condensate collected in the chamber 120 is discharged into a pan 128 through a pipe 130, and from the pan 128 is either conducted outwardly through a pipe 132 or returned to the bubble tower through a connection 134.

With this construction it will be evident that as contrasted with the two preceding forms of construction, the heavier reflux is formed by contact with the inner bank of tubes, as contrasted with the initial engagement with the outer tube ring as in the preceding forms.

What is claimed is:

1. Oil distillation apparatus comprising a distillation tower having a vapor space in the upper portion, condenser tubes located within the vapor space, means for dividing the tubes into vapor passes of unequal length, and means for collecting the condensate formed in each vapor pass.

2. Oil distillation apparatus comprising a distillation tower having a vapor space in the upper portion, a series of condensing tubes located within the vapor space and approximately centrally thereof, means for dividing the inter-tubular space into a series of vapor passes of unequal length, and means for separately collecting the condensate formed in each pass.

3. Oil distillation apparatus comprising a distillation tower having a vapor space in the upper portion, condensing tubes located within the vapor space and approximately centrally thereof, means for dividing the inter-tubular space into vapor passes of unequal length, means for separately collecting the condensate formed in each pass, and means for returning the condensate so collected directly to the distillation tower.

4. Oil distillation apparatus comprising a distillation tower having a vapor space in the upper portion, a generally circular series of condensing tubes located within the vapor space and centrally thereof, a generally circular partition for dividing the inter-tubular space into an inner vapor pass and an outer surrounding vapor pass, one of the passes communicating directly with the vapor space, a condensate collection basin located beneath each vapor pass and adapted to separately collect condensate therefrom, and means for returning the condensate so formed directly to the distillation tower.

5. Oil distillation apparatus comprising a distillation tower having a series of bubble caps, a vapor space in the tower above the caps, a series of condenser tubes projecting downwardly into the vapor space, the tubes being divided into sections of unequal length, means located in the inter-tubular space for separating the sections to form separate and intercommunicating vapor passes extending lengthwise of the tubes, and means for directing vapor from the vapor region successively through the passes.

6. Oil distillation apparatus comprising a distillation tower having a vapor space in the upper portion, a generally circular series of condenser tubes projecting into the vapor space, a circular partition dividing the tubes into inner and outer sections, means for initially directing vapor from the vapor region lengthwise of the tower and surrounding section of condenser tubes and thence directing the vapor lengthwise of the inner core section of tubes, and means for separately collecting the condensate formed in each section.

7. Oil distillation apparatus comprising a distillation tower, condenser tubes projecting downwardly into the tower, a fixed tube support from which the tubes depend, means for supporting the tube support upon the upper portion of the tower, the tubes being divided into inner and outer sections, one section of tubes projecting downwardly into the vapor space below the other section, means for dividing the two sections of tubes into separate vapor passes, and means for initially causing ascending vapors to traverse through one section of tubes and thence through the second section.

8. Oil distillation apparatus comprising a distillation tower, condenser tubes projecting downwardly into the tower, a fixed tube support from which the tubes depend, means for supporting the tube support upon the upper portion of the tower, the tubes being divided into separate sections, one section of tubes projecting downwardly into the vapor space below the other section, means for dividing the two sections of tubes into separate vapor passes, means for initially causing ascending vapors to traverse through one section of tubes and thence through the second section, and means for separately collecting condensate formed in each pass.

9. Oil distillation apparatus comprising a distillation tower encompassing a vapor space in the upper region, a series of condenser tubes located within the vapor space, means for supporting all of the tubes at the upper end, means for dividing the tubes into inner and outer sections, separate floating heads connected to the tubes of each section, a generally cylindrical partition dividing the inner from the outer section to form an inner vapor pass surrounded by an outer annular vapor pass communicating therewith at one end of the tubes, and means for separately collecting the condensate formed in each vapor pass.

10. Oil distillation apparatus comprising a distillation tower encompassing a vapor space in the upper region, a series of condenser tubes located within the vapor space, means for supporting all of the tubes at the upper end, means for dividing the tubes into inner and outer sections, separate floating heads connected to the tubes of each section, a generally cylindrical partition dividing the inner from the outer section to form an inner vapor pass surrounded by an outer annular vapor pass communicating therewith at one end of the tubes, means for separately collecting the condensate formed in each vapor pass, and means for combining the condensate so separately collected.

11. Oil distillation apparatus comprising a distillation tower, a series of condenser tubes located within the tower and having a generally circular formation, means for dividing the tubes into an inner section and an outer annular section, the inner section of tubes projecting downwardly into the vapor space below the outer section, means for first conducting vapor through the outer section of tubes and thence downwardly through the inner section of tubes, means for thereafter removing the vapor from the lower end of the inner section, and means for separately collecting the condensate formed in the inner and outer sections of the tubes.

12. Oil distillation apparatus comprising a distillation tower having a vapor space in the upper region, a series of condensing tubes located within the space having a generally circular formation, means for dividing the tubes into an inner section and an outer surrounding annular section, means for supporting the inner section at the upper end above the outer section, means for conducting vapor to the upper ends of the outer section and thence downwardly lengthwise of the outer section, thence upwardly throughout the inner section, and means for collecting condensate formed in each of the sections.

13. Oil distillation apparatus comprising a distillation tower having a vapor region in the upper portion, a series of condenser tubes projecting into the vapor region, means for dividing the tubes into an inner section and an outer surrounding section, the inner section projecting downwardly below the outer section, means for conducting vapor initially in an upward direction through the inner section, thence downwardly lengthwise of the outer section, means for withdrawing vapor from the lower end of the outer section, and means for collecting condensate formed in the outer section.

NICHOLAS WEBER.